(12) United States Patent
Bengio et al.

(10) Patent No.: US 11,111,146 B2
(45) Date of Patent: Sep. 7, 2021

(54) CARBON NANOTUBE PRODUCT MANUFACTURING SYSTEM AND METHOD OF MANUFACTURE THEREOF

(71) Applicant: Wootz, LLC, Houston, TX (US)

(72) Inventors: Elie Amram Bengio, Houston, TX (US); Alexander Joseph Marks, Houston, TX (US)

(73) Assignee: WOOTZ, LLC, Houston, TX (US)

( * ) Notice: Subject to any disclaimer, the term of this patent is extended or adjusted under 35 U.S.C. 154(b) by 337 days.

(21) Appl. No.: 16/152,246

(22) Filed: Oct. 4, 2018

(65) Prior Publication Data
US 2020/0109054 A1    Apr. 9, 2020

(51) Int. Cl.
| | | |
|---|---|---|
| C01B 32/174 | (2017.01) | |
| D01D 5/06 | (2006.01) | |
| D01F 1/10 | (2006.01) | |
| B29C 48/00 | (2019.01) | |
| B29C 48/05 | (2019.01) | |
| D01F 9/12 | (2006.01) | |
| B82Y 30/00 | (2011.01) | |
| B82Y 40/00 | (2011.01) | |

(52) U.S. Cl.
CPC ........ *C01B 32/174* (2017.08); *B29C 48/0018* (2019.02); *B29C 48/022* (2019.02); *B29C 48/05* (2019.02); *D01D 5/06* (2013.01); *D01F 1/10* (2013.01); *D01F 9/12* (2013.01); *B82Y 30/00* (2013.01); *B82Y 40/00* (2013.01); *C01B 2202/08* (2013.01)

(58) Field of Classification Search
CPC ......... B82Y 40/00; C01B 32/174; D01F 1/10; D01F 9/12; D01D 5/06
See application file for complete search history.

(56) References Cited

U.S. PATENT DOCUMENTS

| | | |
|---|---|---|
| 6,682,677 B2 | 1/2004 | Lobovsky et al. |
| 6,683,783 B1 | 1/2004 | Smalley et al. |
| 6,790,425 B1 | 9/2004 | Smalley et al. |
| 7,938,996 B2 * | 5/2011 | Baughman .............. C01B 32/15  264/108 |
| 9,802,823 B2 * | 10/2017 | Uejima .................... D01F 9/12 |
| 2003/0111333 A1 | 6/2003 | Montgomery et al. |
| 2003/0170166 A1 | 9/2003 | Smalley et al. |

(Continued)

FOREIGN PATENT DOCUMENTS

WO   2013040224 A1   3/2013

OTHER PUBLICATIONS

Natanael Behabtu et al. "Strong, Light, Multifunctional Fibers of Carbon Nanotubes with Ultrahigh Conductivity" SCIENCE, Jan. 11, 2013, pp. 182-186, vol. 339. www.sciencemag.org.

*Primary Examiner* — Atul P. Khare
(74) *Attorney, Agent, or Firm* — Foley & Lardner LLP

(57) ABSTRACT

A method of manufacturing a carbon nanotube product comprising: blending an unaligned carbon nanotube material with solid solvent particles; activating a nanotube solvent by liquefying the solid solvent particles; producing a nanotube dope solution by mixing the nanotube solvent and the unaligned carbon nanotube material; forming a carbon nanotube proto-product by extruding the nanotube dope solution; and forming an aligned carbon nanotube product by solidifying the carbon nanotube proto-product.

21 Claims, 6 Drawing Sheets

(56) References Cited

U.S. PATENT DOCUMENTS

| | | |
|---|---|---|
| 2006/0188718 A1* | 8/2006 | Nitta .................... D01F 1/10 428/373 |
| 2009/0318043 A1* | 12/2009 | Vaugien ................ D01F 1/09 442/60 |
| 2011/0110843 A1 | 5/2011 | Pasquali et al. |
| 2011/0311430 A1* | 12/2011 | Abe ...................... D01F 9/22 423/447.2 |
| 2012/0292578 A1* | 11/2012 | Bacher ................. B29C 48/04 252/511 |
| 2014/0363669 A1* | 12/2014 | Otto .................... C01B 32/168 428/367 |
| 2015/0298164 A1 | 10/2015 | Pasquali et al. |
| 2017/0243668 A1 | 8/2017 | Pasquali et al. |
| 2017/0306529 A1 | 10/2017 | Oh et al. |

\* cited by examiner

CARBON NANOTUBE PRODUCT MANUFACTURING SYSTEM AND METHOD OF MANUFACTURE THEREOF

TECHNICAL FIELD

An embodiment of the present invention relates generally to a system and method for manufacturing a carbon nanotube product.

BACKGROUND

Production of articles from carbon nanotube molecules has found application in numerous fields of technology. In particular, research and development in production of carbon nanotube fibers and sheets have taken a myriad of different directions. However, the availability of consistently producible high quality carbon nanotube articles has become a concern for that desire to take advantage of the properties of the carbon nanotube articles.

Thus, a need still remains for a system for manufacturing high quality carbon nanotube articles. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of manufacture of a carbon nanotube product including: blending an unaligned carbon nanotube material with solid solvent particles; activating a nanotube solvent by liquefying the solid solvent particles; producing a nanotube dope solution by mixing the nanotube solvent and the unaligned carbon nanotube material; forming a carbon nanotube proto-product by extruding the nanotube dope solution; and forming an aligned carbon nanotube product by solidifying the carbon nanotube proto-product.

An embodiment of the present invention provides a method of manufacture of a carbon nanotube product including mixing an unaligned carbon nanotube material with a solvent precursor material; activating a nanotube solvent by reacting the solvent precursor with a solvent activation agent; producing a nanotube dope solution by mixing the nanotube solvent and the unaligned carbon nanotube material; forming a carbon nanotube proto-product by extruding the nanotube dope solution; and forming an aligned carbon nanotube product by solidifying the carbon nanotube proto-product.

An embodiment of the present invention provides a carbon nanotube product manufacturing system including: a solid state blending unit configured to blend an unaligned carbon nanotube material with solid solvent particles; a homogenization unit configured to: activate a nanotube solvent by liquefying the solid solvent particles; mix the nanotube solvent and the unaligned carbon nanotube material to produce a nanotube dope solution; an extrusion assembly configured to extrude the nanotube dope solution as a carbon nanotube proto-product; and a solidification module configured to solidify the carbon nanotube proto-product as an aligned carbon nanotube product.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
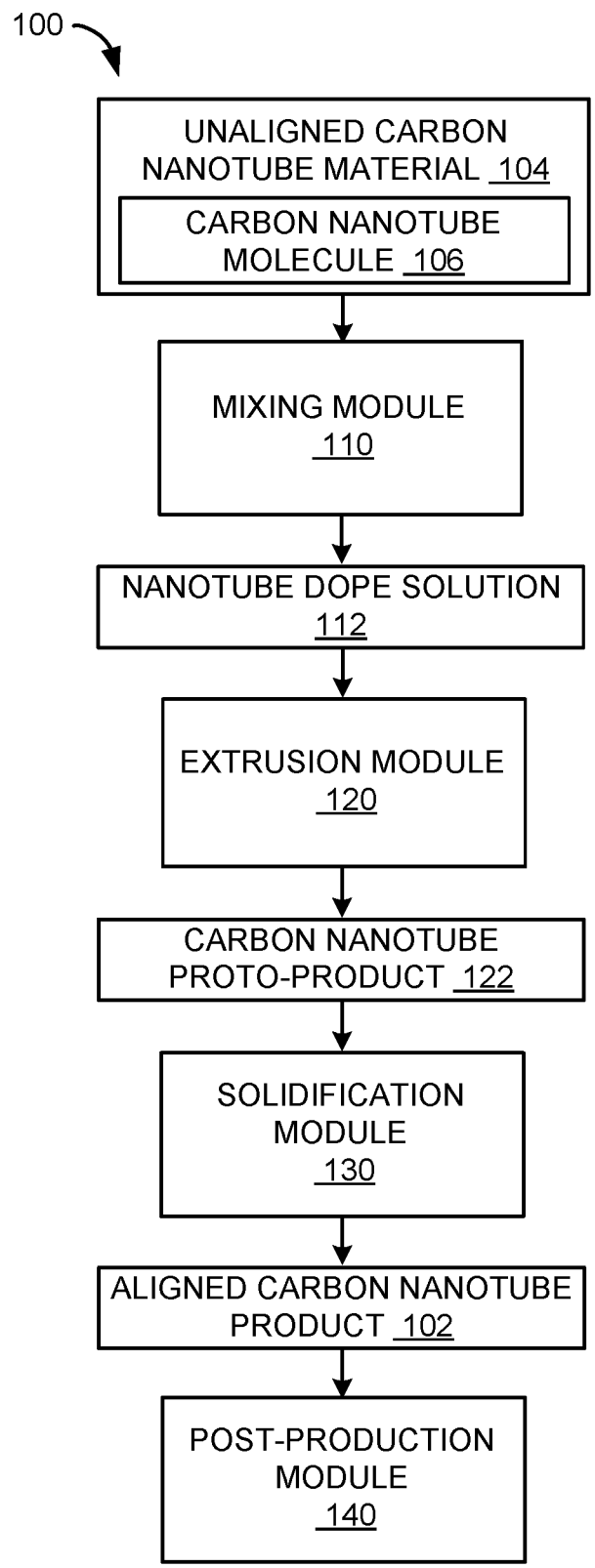
FIG. 1 is a schematic diagram for a carbon nanotube product manufacturing system.

The present invention generally relates to systems, methods, and apparatus, for processing of unaligned carbon nanotube materials. One aspect relates to a system for producing aligned carbon nanotube materials in various forms. The system as disclosed herein includes modular units, assemblies, devices, and the like for manufacture of the aligned carbon nanotube materials.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

For convenience, certain terms employed in the entire application are collected here. Unless defined otherwise, all technical and scientific terms used herein have the same meaning as commonly understood by one of ordinary skill in the art to which this invention belongs.

The term "substantially pure", with respect to a carbon nanotube material, refers to a carbon nanotube material that is at least about 75%, preferably at least about 85%, more preferably at least about 90%, and most preferably at least about 95% pure, with respect to carbon nanotube molecules making up the carbon nanotube material. Recast, the terms "substantially pure" or "essentially purified", with regard to a carbon nanotube material, refers to a carbon nanotube material that contain fewer than about 20%, more preferably fewer than about 15%, 10%, 8%, 7%, most preferably fewer than about 5%, 4%, 3%, 2%, 1%, or less than 1%, of molecules which are not of the desired carbon nanotube material.

As used herein the term "comprising" or "comprises" is used in reference to compositions, methods, and respective component(s) thereof, that are essential to the invention, yet open to the inclusion of unspecified elements, whether essential or not. By way of further example, a composition that comprises elements A and B also encompasses a composition consisting of A, B and C. The terms "comprising" means "including principally, but not necessary solely". Furthermore, variation of the word "comprising", such as "comprise" and "comprises", have correspondingly varied meanings. The term "consisting essentially" means "including principally, but not necessary solely at least one", and as such, is intended to mean a "selection of one or more, and in any combination." In the context of the specification, the term "comprising" means "including principally, but not necessary solely".

As used herein the term "consisting essentially of" refers to those elements required for a given embodiment. The term permits the presence of additional elements that do not materially affect the basic and novel or functional characteristic(s) of that embodiment of the invention.

The term "consisting of" refers to compositions, methods, and respective components thereof as described herein, which are exclusive of any element not recited in that description of the embodiment.

As used in this specification and the appended claims, the singular forms "a," "an," and "the" include plural references unless the context clearly dictates otherwise. Thus for example, references to "the method" includes one or more methods, and/or steps of the type described herein and/or which will become apparent to those persons skilled in the art upon reading this disclosure and so forth.

It is understood that the foregoing detailed description and the following examples are illustrative only and are not to be taken as limitations upon the scope of the invention. Various changes and modifications to the disclosed embodiments, which will be apparent to those of skill in the art, may be made without departing from the spirit and scope of the present invention.

It should be understood that this invention is not limited to the particular methodology, protocols, and reagents, etc., described herein and as such can vary. The terminology used herein is for the purpose of describing particular embodiments only, and is not intended to limit the scope of the present invention, which is defined solely by the claims.

Referring now to FIG. 1, therein is shown a schematic diagram for a carbon nanotube product manufacturing system 100. The carbon nanotube product manufacturing system 100 can produce an aligned carbon nanotube product 102 from an unaligned carbon nanotube material 104. The unaligned carbon nanotube material 104 is a structure containing a multitude of carbon nanotube molecules 106. For example, the unaligned carbon nanotube material 104 can be a bulk solid fibrous structure of a low density. The carbon nanotube molecules 106 are the individual carbon nanotube macro molecules within the unaligned carbon nanotube material 104 and the aligned carbon nanotube product 102. As an example, the carbon nanotube molecules 106 can be single walled carbon nanotube molecules, although it is understood that the carbon nanotube molecules 106 can be of other structures, shapes or morphologies, such as double walled, multi-walled carbon nanotube molecules, or a combination thereof. In the unaligned carbon nanotube material 104, the carbon nanotube molecules 106 can be randomly oriented and held together by attractive intermolecular van-der-Waals forces.

The aligned carbon nanotube product 102 is a material formed by aligning the carbon nanotube molecules 106 axially, longitudinally, along the long axis or a combination thereof of the lengths of the carbon nanotube molecules 106. In general, the aligned carbon nanotube product 102 can be produced by separating each of the carbon nanotube molecules 106 from one another by overcoming the attractive intermolecular van-der-Waals forces and reestablishing the attractive intermolecular forces in a lengthwise orientation, which provides the basis for the highly desirable mechanical properties. The aligned carbon nanotube product 102 can be produced in a number of different forms. For example, the aligned carbon nanotube product 102 can be in the form of filaments, fibers, films, or a combination thereof that can be assembled or integrated into other materials or structures, such as threads, yarns, sheets, fabrics foams, or tapes. The aligned carbon nanotube product 102 can be combined with itself or with other types of materials.

The carbon nanotube molecules 106 chosen for producing the aligned carbon nanotube product 102 can be characterized by an aspect ratio of length to diameter (L/D) and a purity determined by a G-band to D-band (G/D) ratio. For example, the carbon nanotube molecules 106 can preferably have the aspect ratio greater than 500 and a G/D ratio greater than 4, more preferably the carbon nanotube molecules 106 can have an aspect ratio greater than 1000 and a G/D ratio greater than 6, most preferably the carbon nanotube molecules 106 can have an aspect ratio greater than 2000 and a G/D ratio greater than 10.

The carbon nanotube product manufacturing system 100 can include one or more processing modules to produce the aligned carbon nanotube product 102. Each of the processing modules can include one or more physical processing units, such as devices, machines, mechanisms, assemblies, physical coupling implements, or a combination thereof for manufacturing the aligned carbon nanotube product 102. Examples of the units of the carbon nanotube product manufacturing system 100 can include a mixing module 110, an extrusion module 120, a solidification module 130, a post production module 140, or a combination thereof. As a further example, the extrusion module 120 can be coupled to the homogenization unit 220, the solidification module 130 can be coupled to the extrusion module 130, and the post production module 140 can be coupled to the solidification module 130. In yet a further example, the modules can be an integrated in-line continuous or semi-continuous process.

The mixing module 110 is for producing a solution of the carbon nanotube molecules 106 capable of being extruded. For example, the mixing module 110 can include processing units to produce a nanotube dope solution 112 from the unaligned carbon nanotube material 104. The nanotube dope solution 112 is a liquid solution in which the carbon nanotube molecules 106 have been separated from one another in a solvent. In some embodiments, the mixing module 110 can include units for solid state blending of the unaligned carbon nanotube material 104, dissolution and liquid state mixing of the unaligned carbon nanotube material 104, or a combination thereof. In some embodiments, the mixing module 110 can include units for adjusting the concentration of the nanotube dope solution 112. The details for the mixing module 110 will be discussed further below.

The extrusion module 120 is for processing the nanotube dope solution 112 to form a carbon nanotube proto-product 122. For example, the extrusion module 120 is for homogenizing the temperature, pressure, chemical composition, or a combination thereof of the nanotube dope solution 112 prior to formation of the carbon nanotube proto-product 122. The carbon nanotube proto-product 122 is a material having the initial physical form of the aligned carbon nanotube product 102 prior to full alignment of the carbon nanotube molecules 106. For example, the carbon nanotube proto-product 112 can be produced by the extrusion module 120 having a composition that is primarily of solvent, as measured by volume or weight fraction. In some embodiments, the extrusion module 120 can include processing units to refine the nanotube dope solution 112, shape the nanotube dope solution 112 into various physical forms and shapes, or a combination thereof. The details for the extrusion module 120 will be discussed further below.

The solidification module 130 is for producing the aligned carbon nanotube product 102 from the carbon nanotube proto-product 122. In some embodiments, the solidification module 130 can include processing units to solidify the carbon nanotube proto-product 122, impart alignment to the carbon nanotube molecules 106 within the carbon nanotube proto-product 122, or a combination thereof. The details for the solidification module 130 will be discussed further below.

The post production module 140 is for enhancing or modifying the aligned carbon nanotube product 102. In some embodiments, the post-processing module 140 can include processing units for purification of the aligned carbon nanotube product 102, optional modification of the aligned carbon nanotube product 102, manipulating or altering the physical form of the aligned carbon nanotube product 102, integration of the aligned carbon nanotube product 102 into additional structures or with additional materials, or a combination thereof. The details for the post production module 140 will be discussed further below.

In some embodiments, the carbon nanotube product manufacturing system 100 can produce the aligned carbon nanotube product 102 as a carbon nanotube filament, fiber, or film. As an example, the aligned carbon nanotube product 102 in the form of the filament, fiber, or film produced by the carbon nanotube product manufacturing system 100 can be characterized by one or more properties, such as tensile strength, elongation, stress fatigue, porosity or void fraction, molecular alignment, purity, electrical conductivity, or a combination thereof. The following are examples of properties of the aligned carbon nanotube product 102 achieved through the carbon nanotube product manufacturing system 100.

The property of tensile strength for the aligned carbon nanotube product 102 can be in excess of 3 GPa. In general, the tensile strength for the carbon nanotube molecules 106 is approximately 60 GPa. The carbon nanotube product manufacturing system 100 can produce the aligned carbon nanotube product 102 that translates up to 40% of molecular-scale properties to the macroscale of the aligned carbon nanotube product 102, which can yield a CNT fiber with 24 GPa. For comparison, Kevlar stands at about 3.6 GPa, though many different grades of Kevlar are available.

The property of elongation for the aligned carbon nanotube product 102 can be between 0.5% and 10% elongation until break. The carbon nanotube product manufacturing system 100 can be tailored to trade-off between strength and elongation such that the aligned carbon nanotube product 102 can be stronger and stiffer at the expense of elongation, or vice-versa.

The property of stress fatigue for the aligned carbon nanotube product 102 undergo billions of cycles of deformation until break at 15% deformation. The property of porosity or void fraction for the aligned carbon nanotube product 102 can be at a void fraction of preferably less than 20%, more preferably less than 10%, and most preferably less than 5% as determined by Brunauer-Emmett-Teller (BET) methods of nitrogen ($N_2$) or carbon dioxide ($CO_2$) gas absorption. The property of molecular alignment for the aligned carbon nanotube product 102 can be of a Herman orientation factor in excess of preferably 0.8, more preferably 0.9 and most preferably 0.95 as measured through diffraction or scattering techniques, such as X-ray and neutron diffraction. The property of purity for the aligned carbon nanotube product 102 can be a G/D ratio preferably in excess of 5, more preferably in excess of 10 and most preferably in excess of 20, as measured by Raman spectroscopy. The property of electrical conductivity for the aligned carbon nanotube product 102 can be in excess of $10^6$ S/m.

The carbon nanotube product manufacturing system 100 can include additional units or devices to produce devices and components that can be assembled with the aligned carbon nanotube product 102. For example, the devices and components assembled from the aligned carbon nanotube product 102 can include wire antennas, patch antennas, coil transformers, coaxial cables. In another example, the aligned carbon nanotube product 102 can be a component that is integrated into other structures, such as ropes, yarns, woven fabrics, resin pre-impregnated tapes or fabrics, foams, chopped fiber filler material, or laminated films.

Figure 2:
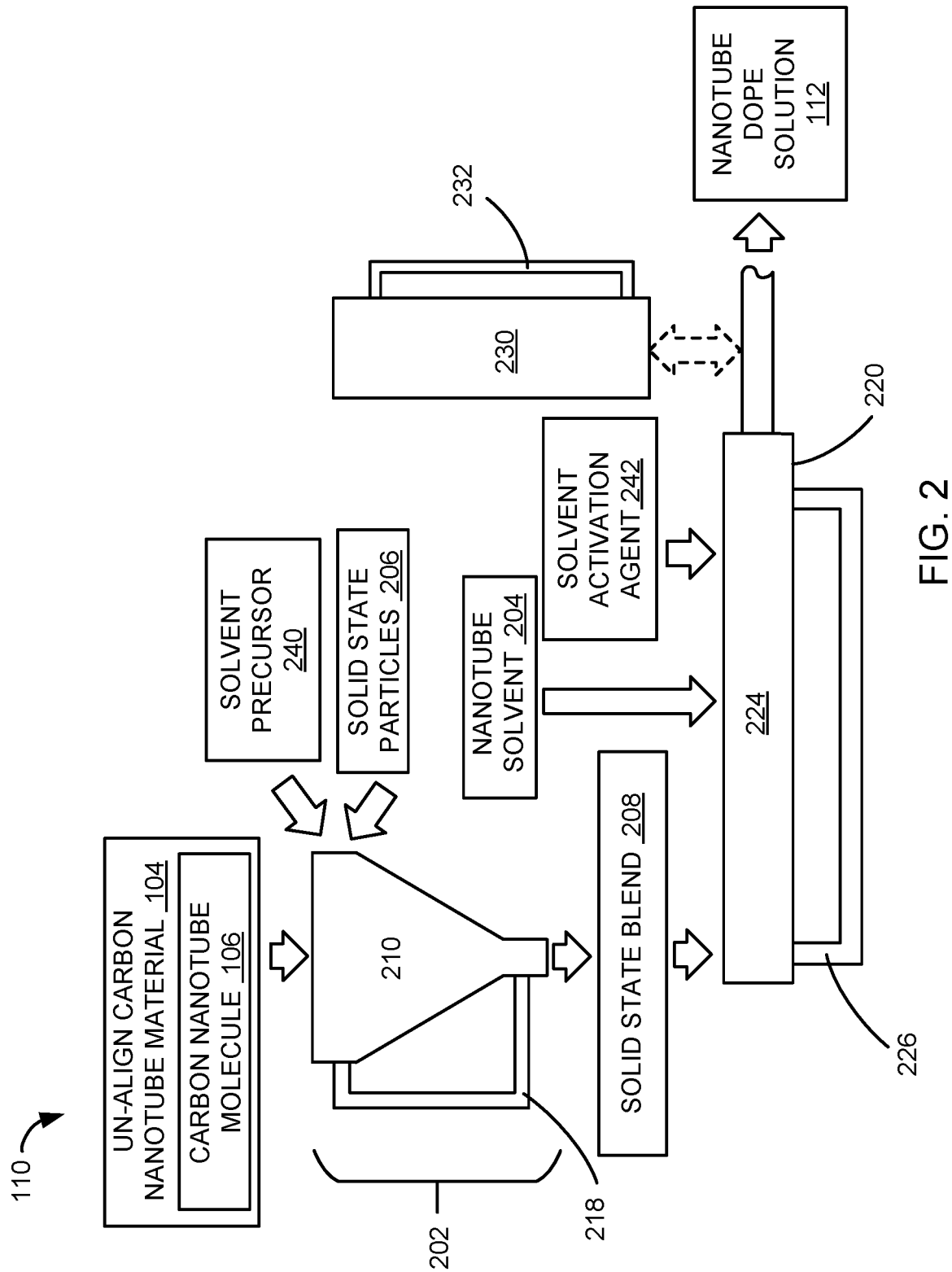
FIG. 2 is a schematic view of the mixing module for the carbon nanotube product manufacturing system of FIG. 1.

Referring now to FIG. 2, therein is shown a schematic view of the mixing module 110 for the carbon nanotube product manufacturing system 100 of FIG. 1. The mixing module 110 can include one or more processing units to produce the nanotube dope solution 112 from the unaligned carbon nanotube material 104. For example, the mixing module 110 can include a blending unit 202, a homogenization unit 220, a concentration adjustment unit 230, or a combination thereof.

The blending unit 202 is for solid state comminuting, classification, blending, or a combination thereof of materials. More specifically, the blending unit 202 can produce a free-flowing dry powder blend material that will not spontaneously separate or segregate during transfer. For example, in one embodiment, the blending unit 202 can be configured to uniformly disperse a nanotube solvent 204 as solid solvent particles 206 throughout the unaligned carbon nanotube material 104 to produce a solid state blend 208. In general, the since the nanotube solvent 204 is solidified into the solid solvent particles 206, the solid state blend 208 of the solid solvent particles 206 and the unaligned carbon nanotube material 104 is a dry mixture. In another embodiment, the blending unit 202 can be configured to uniformly disperse a solvent precursor material 240 throughout the unaligned carbon nanotube material 104 to produce the solid state blend 202. In a further embodiment, the blending unit 202 can be configured to physically process the unaligned carbon nanotube material 104 without the addition of the nanotube solvent 204.

In one example, the nanotube solvent 204 is a solvent capable of dissolution of the carbon nanotube molecules 106 in the unaligned carbon nanotube material 104. More specifically, the nanotube solvent 204 can be capable of protonating the delocalized 7E electron on the sp2 carbon lattice of the carbon nanotube molecules 106. As an example, the carbon nanotube solvent 204 can be an acid, such as chlorosulfonic acid ($HSO_3Cl$), fluorosulfonic acid, fluorosulfuric acid, hydrochloric acid, methanesulfonic acid, nitric acid, hydrofluoric acid, fluoroantimonic acid, magic acid, or any other type of carborane-based acids. As another example, the nanotube solvent 204 can be a supercritical fluid, which is a substance at a temperature and pressure above its critical point. The nanotube solvent 204 as the supercritical fluid provides screening of the electrostatic interactions between solute molecules, in this case the carbon nanotube molecules 106, to negate surface tension effects and particle-particle interactions and enable solution processing as the nanotube dope solution 112 described herein. Past the critical point of the nanotube solvent 204, its temperature and pressure can be regulated to maintain maximum solubility of the carbon nanotube molecules 106 such that the nanotube solvent 204 in the supercritical state can be considered athermal for all effective purposes. As an example, the nanotube solvent 204 as the super critical fluid can include supercritical carbon dioxide.

The solvent precursor material 240 is a chemical compound that alone is incapable of dissolving the unaligned carbon nanotube material 104. In general, the solvent precursor material 240 is a solid material that can be mixed with, reacted with, or a combination thereof of a solvent activation agent 242 to produce the nanotube solvent 204. An example combination of the solvent precursor material 240 and the solvent activation agent 242 can be phosphorous pentachloride in powder form and sulfuric acid, respectively.

In one embodiment, the blending unit 202 can include a blending chamber 210 configured to receive and blend the unaligned carbon nanotube material 104 and the solid solvent particles 206. As an example, the blending chamber 210 can be a vessel having a conical shape. As a specific example, the blending chamber 210 can include walls with an angle of repose between 45° and 75°, and most preferably 60°, to facilitate discharge of the solid state blend 208. For illustrative purposes, the blending chamber 210 is shown having a conical shape, although it is understood that the blending chamber 210 can be of other shapes or configurations, such as a cylindrical, ovular profile, or egg shape.

The blending unit 202 can include blending elements within the blending chamber 210. For example, the blending elements can be a helical screw travelling a path determined by the interior surface of the blending chamber 210.

The blending elements can include separation instruments for physical separation of the unaligned carbon nanotube material 104. For example, the separation instruments can be small bristles, claws, or hooks. The separation instruments can be attached to or extend from the surface of the blending elements. For example, the blending elements can include the separation instruments along their surface to pull apart the unaligned carbon nanotube material 104. In some embodiments, the blending elements can expose the surfaces of the unaligned carbon nanotube material 104 to the solid solvent particles 206. In other embodiments, the blending elements can expose the surfaces of the unaligned carbon nanotube material 104 to the solvent precursor material 240.

The blending unit 202 includes charging capability from the top and sides of the blending chamber 210. For example, the charging capability for the unaligned carbon nanotube material 104 can include one or more mechanical feeder mechanisms.

In some embodiments, the charging capability of the blending unit 202 for the nanotube solvent 204 in the liquid state can include one or more spray nozzles, mist nozzle, atomizers, or a combination thereof located at various positions within the blending unit 202. As a specific example, spray nozzles or atomizers can be configured in such a way as to dispense the nanotube solvent 204 in a liquid form at a droplet size to promote formation the solid solvent particles 206 in the form of amorphous or crystalline particles. In another embodiment, the charging capability into the blending unit 202 for the nanotube solvent 204 can include the capability of introducing the solid solvent particles 206 or the solvent precursor material 240.

Examples of the solid charging capability can include powder dispensers or powder coating mechanisms. The blending unit 202 can include a discharge capability for the solid state blend 208 through the bottom of the blending unit 202.

The blending unit 202 can include a blend recirculation loop 218. The blend recirculation loop 218 can be a closed recirculating loop around the blending unit 202. The blend recirculation loop 218 enables the blending unit 202 to continuously recirculate the unaligned carbon nanotube material 104 through the blending unit 202.

The blending unit 202 can include a temperature control apparatus. For example, the temperature control apparatus can include an insulation layer, a liquid nitrogen or liquid helium jacketed cooling system, or a combination thereof.

The blending unit 202 can be coupled to the homogenization unit 220. The homogenization unit 220 is for producing the nanotube dope solution 112. The homogenization unit 220 can be an apparatus or device that includes a mixing element within an enclosed mixing chamber 224, such as an enclosed reciprocating kneading assembly. As an example, the homogenization unit 220 can be horizontally oriented with the mixing element as a single screw or twin screw kneading assembly enclosed in a barrel. The mixing element can provide low-medium shear for mixing of the materials within the homogenization unit 220. The homogenization unit 220 can be configured to allow interchangeability of the mixing element and the enclosed mixing chamber 224.

In some embodiments, the homogenization unit 220 can include charging capabilities along the mixing chamber 224. In some embodiments, the mixing chamber 224 can include spray heads or nozzles to introduce the solvent activation agent 242 into the mixing chamber 224. In other embodiments, the mixing chamber 224 can include spray heads or nozzles to introduce the nanotube solvent 204 into the mixing chamber 224.

The enclosed mixing chamber 224 can include volatile gas removal capabilities. In particular, the enclosed mixing chamber 224 can evacuate gas and other volatile by-products, such as hydrochloric acid (HCl) gas, produced during the dissolution of the unaligned carbon nanotube material 104 in the nanotube solvent 204, reaction of the solvent precursor material 240 with the solvent activation agent 242, or a combination thereof.

The homogenization unit 220 can include temperature control capabilities to monitor, change, maintain, or a combination thereof the temperature within the homogenization unit 220. For example, the homogenization unit 220 can be capable of a gradual or incremental increase in temperature over a given period of time. In some embodiments, the temperature control capability of the homogenization unit 220 can enable controlled liquefaction of the solid solvent particles 206 to the nanotube solvent 204 in a liquid state. In other embodiments, the temperature control capability of the homogenization unit 220 can enable a gradual increase in temperature to control the reaction, mixing, or a combination thereof between the solvent precursor material 240 with the solvent activation agent 242.

Measurement units can be included at one or more positions along the homogenization unit 220 to monitor the quality of the nanotube dope solution 112. For example, the measurement units can be inline sensor units, including spectrometers to measure the wavelength shift due to the protonation of the carbon nanotube backbones. As another example, the measurement units can be devices for rheological evaluation of the nanotube dope solution 112. In another example, the measurement units can be devices for optical measurements of the birefringence of the nanotube dope solution 112.

The homogenization unit 220 can include a flow recirculation loop 226 to allow recirculate the nanotube dope solution 112 through the homogenization unit 220. Additional mixing hardware, such as a high shear mixer, can be including along the flow recirculation loop 226.

The mixing module 110 can optionally include the concentration adjustment unit 230, as indicated by the dashed outlined arrow. The concentration adjustment unit 230 is for adjusting the concentration of the nanotube dope solution 112. The concentration adjustment unit 230 can include one or more of a pressure and temperature controlled vessel configured to remove or add specified amounts of the nanotube solvent 204 from or to the nanotube dope solution 112. For example, the concentration adjustment unit 230 can include one or more distillation columns or apparatus configured for evaporation of the nanotube solvent 204 from the nanotube dope solution 112. For illustrative purposes, the concentration adjustment unit 230 is shown with a single instance of the distillation apparatus although it is understood that the concentration adjustment unit 230 can include multiple instances of the distillation apparatus coupled to one another in parallel, series, or a combination thereof to process the nanotube dope solution 112. In another example, the concentration adjustment unit 230 can include a concentration recirculation loop 232 to recirculate the nanotube dope solution 112 through the concentration adjustment unit 230.

The concentration adjustment unit 230 can be configured to operate under various atmospheric conditions and compositions. For example, the concentration adjustment unit 230 can provide an HCl saturated atmosphere that can be co-fluxed with nanotube solvent 204 that has evaporated from the nanotube dope solution 112. As another example, the concentration adjustment unit 230 can be configured to operate under a range of pressures, temperatures, or a combination thereof. In general, the concentration adjustment unit 230 can be configured to operate at pressures of 30 to 35 mm Hg or 0.039 to 0.046 atmospheres and temperatures ranging from 85 to 90° C.

The concentration adjustment unit 230 can include measurement devices to monitor the concentration of the nanotube dope solution 112. For example, the measurement devices can include rheometers for contact or non-contact evaluation of viscoelasticity and liquid crystallinity properties of the nanotube dope solution 112. In another example, the measurement devices can include spectrometers to determine the wavelength shift associated with the protonation of the backbones of the carbon nanotube molecules 106 in the nanotube dope solution 112 by Raman spectroscopy.

Figure 3:
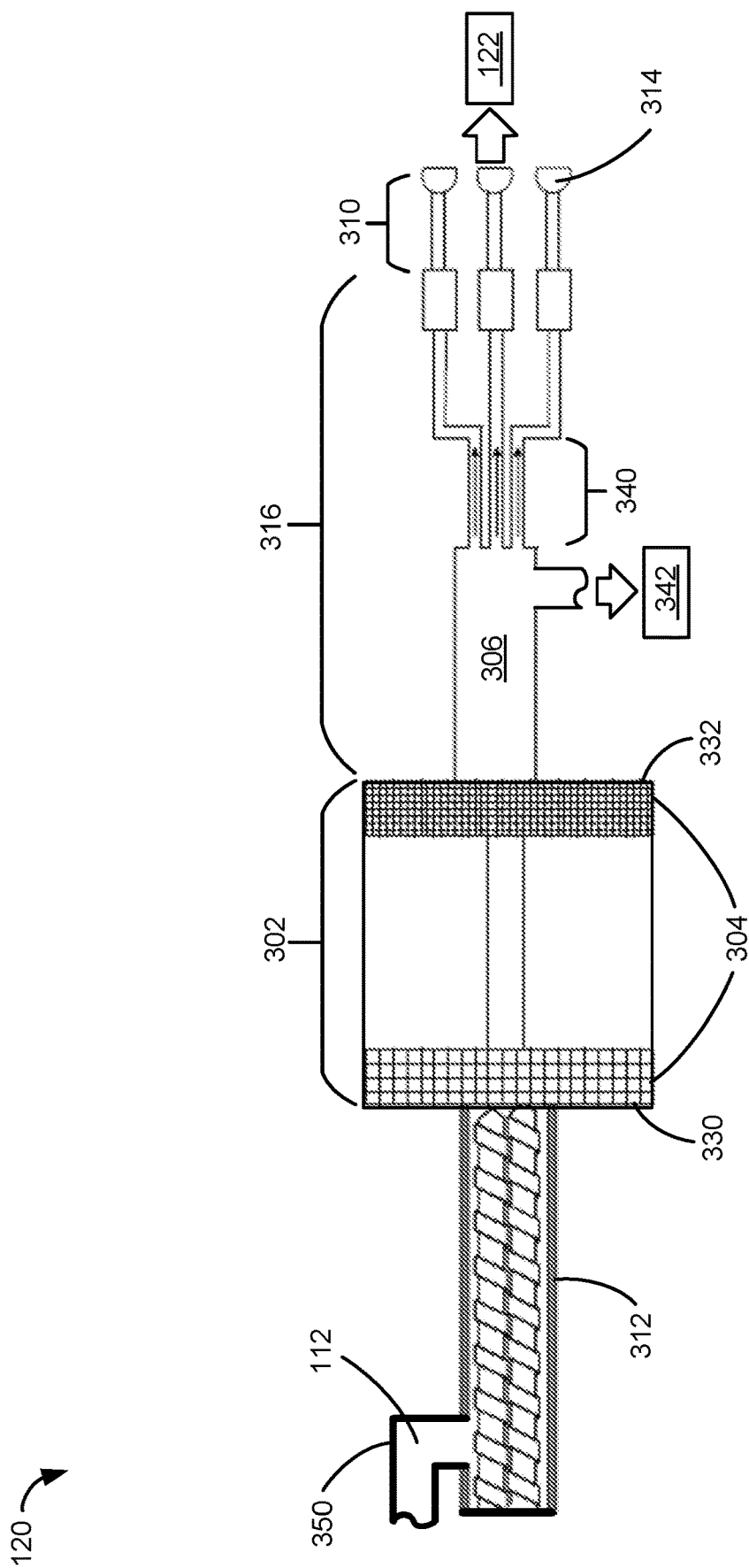
FIG. 3 is a schematic view of the extrusion module of the carbon nanotube product manufacturing system of FIG. 1.

Referring now to FIG. 3, therein is shown a schematic view of the extrusion module 120 of the carbon nanotube product manufacturing system 100 of FIG. 1. The extrusion module 120 can include one or more processing units to produce the carbon nanotube proto-product 122 from the nanotube dope solution 112. For example, the extrusion module 120 can include a flow drive mechanism 312, a filtration unit 302, an extrusion assembly 310, an extrusion flow manifold 316, or a combination thereof.

The extrusion module 120 can be coupled to the mixing module 110 of FIG. 2. For example, the extrusion module 120 can be coupled to the mixing module 110 by a fluid transfer path 350, such as a pipe or tube. The nanotube dope solution 112 can be transferred through the fluid transfer path 350 from the mixing module 110 to the extrusion module 120. In some embodiments, the fluid transfer path 350 can include static mixing elements to create a sustained turbulent flow regime for the nanotube dope solution 112, which provides mixing and controlled heat transfer from heat exchange fluid recirculation inside the static mixing elements, outside the static mixing elements, or a combination thereof.

The extrusion module 120 can receive the nanotube dope solution 112 through the flow drive mechanism 312. The flow drive mechanism 312 is for promoting flow of the nanotube dope solution 112 through the extrusion module 120 and maintaining homogenous properties of the nanotube dope solution 112. The flow drive mechanism 312 provides development of consistent pressure, which promotes uniform flow of the nanotube dope solution 112 through the extrusion module 120. As a specific example, the flow drive mechanism 312 can be a twin-screw extruder which is capable of being "starve-fed" and provides a balance of kneading and mixing elements, which assists in maintaining homogenous properties such as temperature, pressure, concentration, or a combination thereof for the nanotube dope solution 112.

In some embodiments, the extrusion module 120 can include the filtration unit 302. The filtration unit 302 can be included to increase the purity of the nanotube dope solution 112. For example, the filtration unit 302 can include filtration elements 304 to remove residual particles, such as metallic catalyst particles, amorphous carbon particles, sp3 carbon particles, or a combination thereof from the nanotube dope solution 112. Different embodiments of the filtration unit 302 can include various configurations and combinations of the filtration elements 304 depending on the size of the residual particles or the purity of the unaligned carbon nanotube material 104. For example, the filtration unit 302 can include one or more of a coarse filtration element 330, such as coarse screen packs or coarse screen changers, one or more of a fine filtration element 332, such as fine screen packs or fine screen changers, or a combination thereof. The filtration elements 304 can be configured for continuous or semi-continuous renewal or changeable during operation of the filtration unit 302. In some embodiments, the filtration unit 302 can include can include booster pumps and pressure sensors as needed to aid or promote flow of the nanotube dope solution 112 through the filtration elements 304.

The extrusion flow manifold 316 can be coupled to the filtration unit 302. The extrusion flow manifold 316 is for directing the flow of the nanotube dope solution 112 within the extrusion module 120. More specifically, any of the passages in the extrusion flow manifold 316 that the nanotube dope solution 112 flows through prior to exiting the extrusion unit 120 can have adjustable construction to alter the pattern or symmetry of flow of the nanotube dope solution 112 to achieve desired result after exit from the extrusion unit 120. The extrusion flow manifold 316 can separate or merge the flow of the nanotube dope solution 112 in various configurations to accommodate different flow schemes through the extrusion module 120. As one example, the extrusion flow manifold 316 can accommodate different schemes or arrangements of the filtration elements 304 of the filtration unit 302 in the fractionation unit 306, such as a recirculation loop (not shown) through to recirculate the nanotube dope solution 112 through the filtration unit 302.

The extrusion flow manifold 316 can include a fractionation pathway 306. The fractionation pathway 306 is for separation of the carbon nanotube molecules 106 in the nanotube dope solution 112 based on the aspect ratio of the carbon nanotube molecules 106. For example, the fractionation pathway 306 can include elements configured to impart a sheering force on the flow of the nanotube dope solution 112. Under sufficiently high shear, it is expected that the nanotube dope solution 112 will phase separate into a highly crystalline phase 332, which is comprised primarily of the carbon nanotube molecules 106 having the highest aspect ratio in the nanotube dope solution 112, and a concentrated isotropic phase 330, which is comprised primarily of the carbon nanotube molecules 106 having the lowest aspect ratio in the nanotube dope solution 112.

The extrusion flow manifold 316 can accommodate different schemes or arrangements of the flow for the different phases in the fractionation pathway 306. For example, the fractionation pathway 306 can include flow separation and recombination manifold configured to separate and redirect the concentrated isotropic phase 330 from the highly crystalline phase 332 as processing waste or low-grade material. The highly crystalline phase 332 can be allowed to proceed towards the extrusion assembly 310. Optionally, the extrusion flow manifold 316 can include pumps to drive the flow of the highly crystalline phase 332 and the concentrated isotropic phase 330 through to the extrusion flow manifold 316 to the extrusion assembly 310.

The extrusion assembly 310 is for producing the carbon nanotube proto-product 122. The extrusion assembly 310 can include an extrusion die 314. The extrusion die 314 is for extrusion of the nanotube dope solution 112 to form the carbon nanotube proto-product 122. For example, the extrusion die 314 can be for shaping, initial alignment, or a combination thereof carbon nanotube proto-product 122. The extrusion assembly 310 can be configured to include one or more instances of the extrusion die 314. In general, the extrusion assembly 310 can include the extrusion die 314 with a die opening or aperture corresponding to the form factor of the carbon nanotube proto-product 122 and, ultimately, the aligned carbon nanotube product 102.

The extrusion die 314 for forming, shaping, and initial alignment of the carbon nanotube proto-product 122 as a fiber or filament, or film can be set in one or more different configurations. In the case of producing the carbon nanotube proto-product 122 in the form of a film, the extrusion die 314 can be a slotted die. In the case of producing the carbon nanotube proto-product 112 in the form of a fiber or filament, the extrusion die 314 can be a single holed spinneret or multi-holed spinneret. In general, the hole in the extrusion die 314 can have a conical cross-sectional profile terminating in a flat land of length suitable to elongate domains and promote alignment of the carbon nanotube molecules 106. As another example, the spinneret housing for the extrusion die 314 can be static. In a further example, the spinneret housing for the extrusion die 314 can be held inside a sealed bearing assembly, which allows for the twisting, rotation, or a combination thereof of the liquid crystalline domains of the nanotube dope solution 112 during flow to confer extra strength to the carbon nanotube proto-product 122 once the domains are solidified in the twisted configuration, the spiral configuration, the helical configuration, or a combination thereof.

The extrusion assembly 310 can optionally include a vibratory apparatus congruent with or upstream of the extrusion die 314. The vibrations produced by the vibratory apparatus can aid flow of the nanotube dope solution 112 through the extrusion die 314 by disturbing undesired elastic turbulence immediately prior to the outlet of the extrusion die 314, improving flow stability by reducing undesirable frictional and shearing effects along flow surfaces, or a combination thereof.

The extrusion flow manifold 316 can accommodate inclusion of multiple instances, various types, and geometries of the extrusion die 314, such as for co-extrusion of the nanotube dope solution 112. In a further example, the extrusion flow manifold 316 can accommodate different flow and production rates, as well as allow for the use of a plurality of upstream and downstream components to increase production capacity without substantially altering the architecture of the system.

Figure 4:
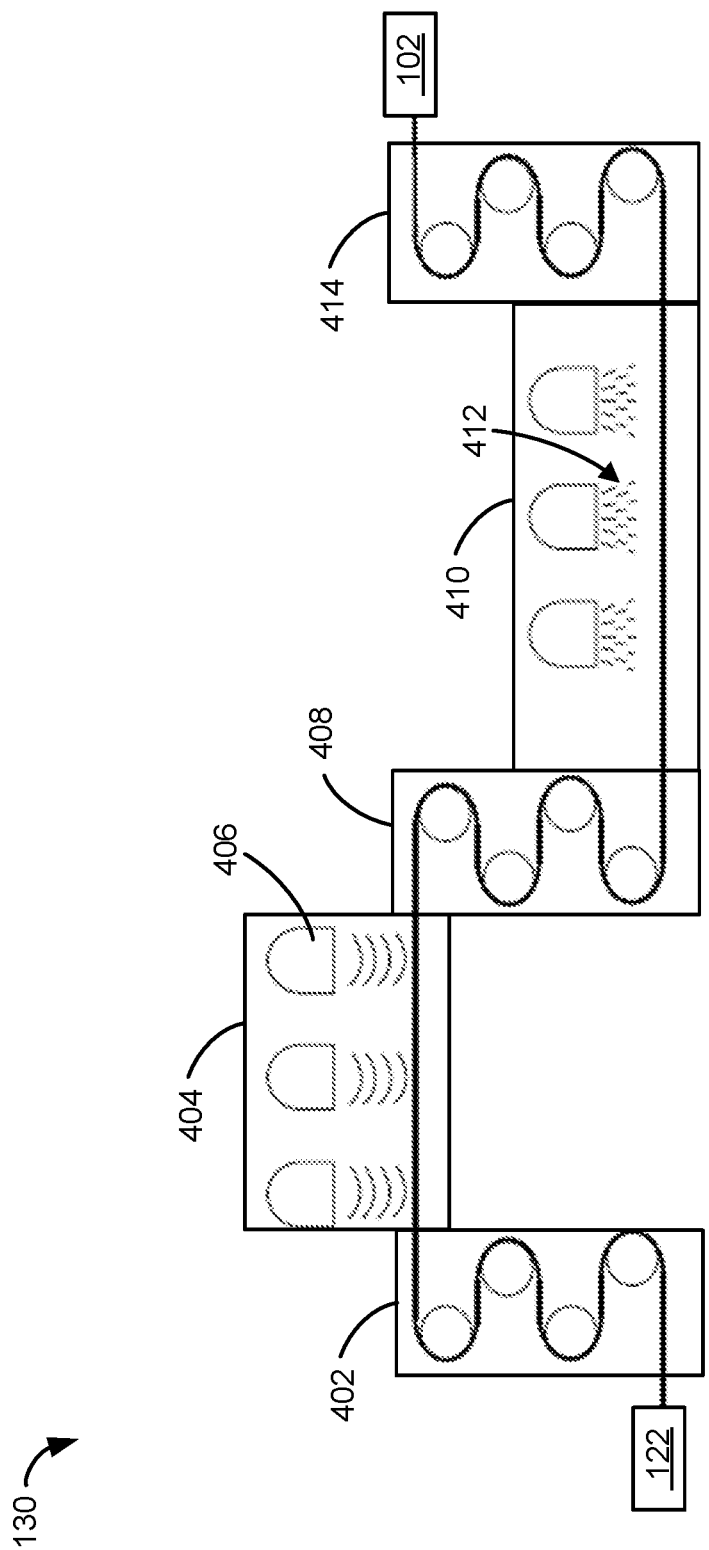
FIG. 4 is a schematic view of the solidification module of the carbon nanotube product manufacturing system of FIG. 1.

Referring now to FIG. 4, therein is shown a schematic view of the solidification module 130 of the carbon nanotube product manufacturing system 100 of FIG. 1. The solidification module 130 can include one or more processing units to produce the aligned carbon nanotube product 102 from the carbon nanotube proto-product 122. For example, the solidification module 130 can include an initial alignment unit 402, an irradiative coagulation unit 404, an intermediate alignment unit 408, a chemical coagulation unit 410, a solid state alignment unit 414, or a combination thereof.

The initial alignment unit 402 is for imposing an alignment to the carbon nanotube molecules 106 in the carbon nanotube proto-product 122 after exit from the extrusion module 120. For example, the initial alignment unit 402 can be a temperature-controlled drum or Godet roll assembly. The initial alignment unit 402 can be configured to draw the carbon nanotube proto-product 122 under tension at speed faster than the flow speed at the extrusion die 314 of FIG. 3 to impose alignment on the carbon nanotube molecules 106 and draw down the cross-sectional area of the carbon nanotube proto-product 122.

The irradiative coagulation unit 404 is for irradiative solidification of the carbon nanotube proto-product 122. For example, the irradiative coagulation unit 404 can include a radiation source 406, such as an array of infrared (IR) radiation emitters. The irradiative coagulation unit 404 can include the radiation source 406 arranged around the proto-product in a controlled atmosphere. The radiation emitted from the radiation source 406 can induce coagulation of the carbon nanotube proto-product 122.

The radiation source 406 is capable of emitting radiation at a wavelength such that absorption by the nanotube solvent 204 is minimized and absorption by carbon nanotube molecules 106 of the carbon nanotube proto-product 122 is maximized. The radiation source 406 can be configured to pulse the radiation to prevent localized heating effects.

The irradiative coagulation unit 404 can include devices to evacuate volatile substances and impose gas flow on the atmosphere surrounding the carbon nanotube proto-product 122. This provides convective heat transfer and assists in controlling the coagulation rate of the carbon nanotube proto-product 122, as well as aid in conveying the carbon nanotube proto-product 122.

The intermediate alignment unit 408 is for imparting alignment to the carbon nanotube molecules 106 in the carbon nanotube proto-product 122 in a partially solidified state. For example, the intermediate alignment unit 408 can be a temperature-controlled drum or Godet roll assembly. The intermediate alignment unit 408 can be configured to draw the carbon nanotube proto-product 122 under tension at speed faster than the flow speed at the extrusion die 314 to impose alignment on the carbon nanotube molecules 106. The rate and tension under which the carbon nanotube proto-product 122 is drawn by the intermediate alignment unit 408 can be the same as, greater than, or less than that of the initial alignment unit 402.

The chemical coagulation unit 410 is for chemical solidification of the carbon nanotube proto-product 122. The chemical coagulation unit 410 can expose the carbon nanotube proto-product 122 to a chemical coagulant 412. The chemical coagulant 412 is a chemical compound that is a solvent for the nanotube solvent 204 and a non-solvent for carbon nanotube proto-product 122. For example, the chemical coagulant 412 can include acetone, water, tetrahydrofuran (THF), dimethyl sulfoxide (DMSO), ether, chloroform, a mixture of sulfuric acid in water. As an example, the concentration of the chemical coagulant 412 can be at a concentration of less than 20%, a mixture of acetic acid in water at a concentration of less than 40%, or a combination thereof.

For illustrative purposes, the chemical coagulant unit 410 is illustrated with a shower head or spray nozzle to apply the chemical coagulant 412 to the carbon nanotube proto-product 122, however it is understood that the chemical coagulant unit 410 can be in a different configuration. For example, the carbon nanotube proto-product 122 can include a bath or immersion tank, a continuously renewed fluid film, or a combination thereof that exposes the carbon nanotube proto-product 122 to the chemical coagulant 412. The chemical coagulation unit 410 can be configured to provide a homogeneous rate of coagulation along the cross-section of the carbon nanotube proto-product 122. The chemical coagulation unit 410 can include devices and mechanisms to provide atmospheric control, convective heat transfer within the chemical coagulation unit 410, such as through evacuation of the volatile substances, imposed gas flow on the atmosphere surrounding the carbon nanotube proto-product 122, and aid in conveying the carbon nanotube proto-product 122.

The solid state alignment unit 414 is for imparting alignment to the carbon nanotube molecules 106 in the carbon nanotube proto-product 122 in a solidified state. For example, the solid state alignment unit 414 can be a temperature-controlled drum or Godet roll assembly. The intermediate alignment unit 408 can be configured to draw the carbon nanotube proto-product 122 under tension at speed faster than the flow speed at the extrusion die to impose alignment on the carbon nanotube molecules 106. Final dimensions of the aligned carbon nanotube product 102 can be set by the solid state alignment unit 414. The rate and tension under which the carbon nanotube proto-product 122 is drawn by the solid state alignment unit 414 can be the same as, greater than, or less than that of the initial alignment unit 402, the intermediate alignment unit 408, or a combination thereof. The solid state alignment unit 414 can include a creel for uptake and storage of the aligned carbon nanotube product 102.

Figure 5:
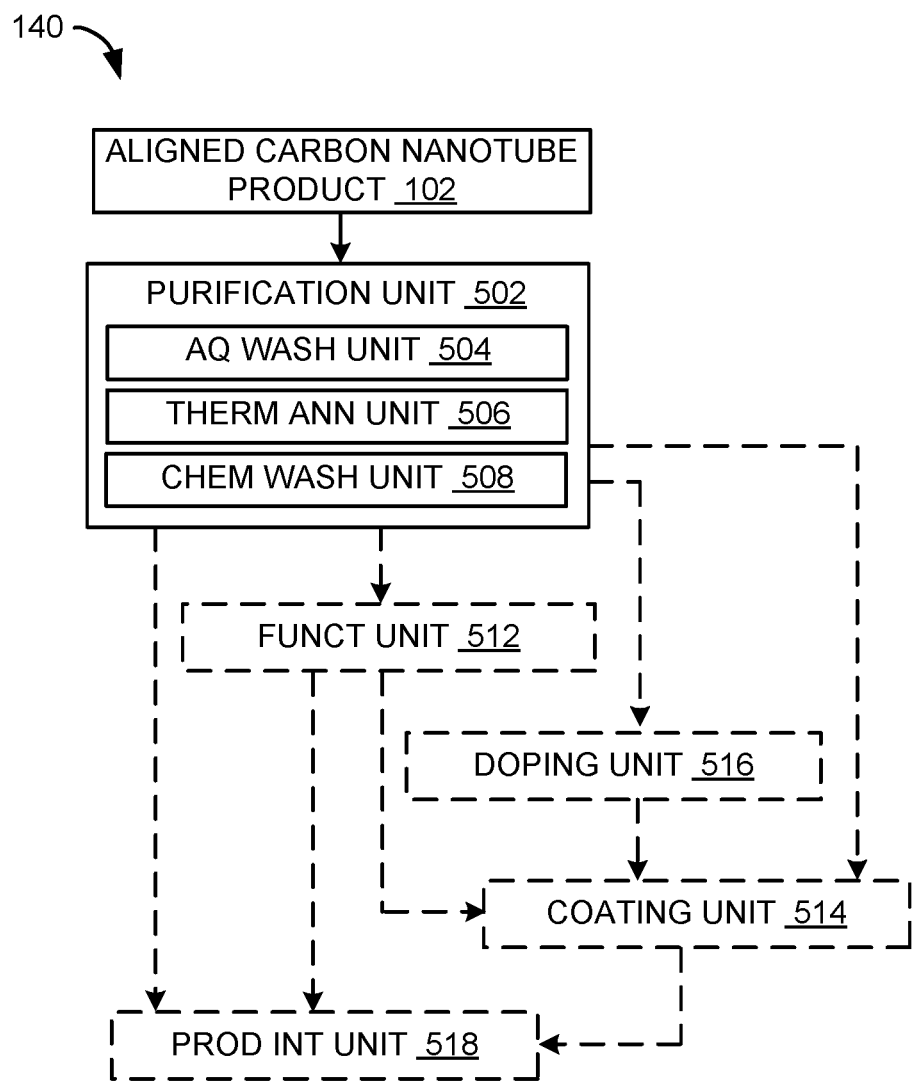
FIG. 5 is a schematic view of the post-production module of the carbon nanotube product manufacturing system of FIG. 1.

Referring now to FIG. 5, therein is shown a schematic view of the post production module 140 of the carbon nanotube product manufacturing system 100 of FIG. 1. The post production module 140 can include one or more processing units to modify the aligned carbon nanotube product 102. For example, the post production module 140 can include a purification unit 502, a functionalization unit 512, a coating unit 514, a doping unit 516, a product integration unit 518, or a combination thereof.

The purification unit 502 is for removing residual processing substances from the aligned carbon nanotube product 102. For example, the purification unit 502 can be configured to remove residual amounts of the nanotube solvent 204 of FIG. 2, the chemical coagulant 412 of FIG. 4, other undesired residual particle on the aligned carbon nanotube product 102, or a combination thereof. The purification unit 502 can include a solvent removal unit 504, a thermal annealing unit 506, a chemical wash unit 508, or a combination thereof. The purification unit 502 can be coupled directly or indirectly to the extrusion module 120 to receive the aligned carbon nanotube product 102.

The solvent removal unit 504 is for removing residual traces of the nanotube solvent 204 from the aligned carbon nanotube product 102. For example, of the solvent removal unit 504 can include an aqueous bath, shower head, spray nozzle, or a combination thereof to wash the aligned carbon nanotube product 102. The solvent removal unit 504 can be configured to deliver and maintain the aqueous wash in, for example, a temperature range of approximately 60° C. to 80° C.

The thermal annealing unit 506 is for removing residual traces of the chemical coagulant 412 from the aligned carbon nanotube product 102. For example, the thermal annealing unit 506 can include an oven or enclosed heating element configured to evacuate gases and volatile substances from the environment around the aligned carbon nanotube product 102.

The chemical wash unit 508 is for removing residual traces of process by-product substances from the aligned carbon nanotube product 102. For example, the chemical wash unit 508 can include a spray nozzle, a shower head, a bath or tank, a continuously renewed fluid film, or a combination thereof to expose the aligned carbon nanotube product 102 to a chemical wash solution. The choice of the chemical wash solution can depend on the choice of chemical coagulant 412 used in the chemical coagulation unit 410 of FIG. 4.

Optionally, the post production module 140 can include one or more additional units for further processing of the aligned carbon nanotube product 102. For example, the post production module 140 can include optional units, such as the functionalization unit 512, the coating unit 514, the doping unit 516, the product integration unit 518, or a combination thereof. In general, the inclusion of the optional units of the post production module 140, as indicated by the dashed lines and arrows, can depend on an intended application for the aligned carbon nanotube product 102.

The functionalization unit 512 is for modifying the molecular structure of the aligned carbon nanotube product 102. For example, the functionalization unit 512 can include a reaction chamber, an oven, or a combination thereof for covalent chemical functionalization of the aligned carbon nanotube product 102.

The coating unit 514 is for applying a coating substance on the aligned carbon nanotube product 102. For example, the coating unit 514 can include an apparatus for mechanical coating of the of the aligned carbon nanotube product 102, such as a dip-coater, roll-to-roll coater, slide-coater, immersion coater, or a combination thereof. In another example, the coating unit 514 can include an apparatus for electrolytic coating of the of the aligned carbon nanotube product 102, such as an electrolytic bath or tank containing an ionic compound for aqueous dispersion at a suitable zeta potential level. In a further example, the coating unit 514 can include an apparatus capable of electrostatic coating of charged solid particles or gas-phase deposition on the aligned carbon nanotube product 102.

The doping unit 516 is for non-covalent chemical functionalization of the aligned carbon nanotube product 102. The doping unit 516 can include a doping chamber with functionality and capabilities based on the doping process. In one example, the doping unit 516 can include a vacuum oven for a gas phase doping process. In another example, the doping unit 516 can include a spray nozzle, a shower head, a bath or tank, a continuously renewed fluid film, or a combination thereof for a liquid phase doping process.

The product integration unit 518 is for integration of the aligned carbon nanotube product 102 into devices, components, or structures. As an example, the production integration unit 518 can include units or devices to integrate one or more instances of the aligned carbon nanotube material 102 into a structure such as ropes, yarns, woven fabrics, foams, resin pre-impregnated tapes or fabrics, chopped fiber filler material, or laminated materials. Examples of such units can include looms, cradles, winders, presses, rollers, or laser cutters. Similarly, the product integration unit 518 can include units to integrate the aligned carbon nanotube product 102 into devices or components, which can include wire antennas, patch antennas, coil transformers, coaxial cables, or a combination thereof.

Figure 6:
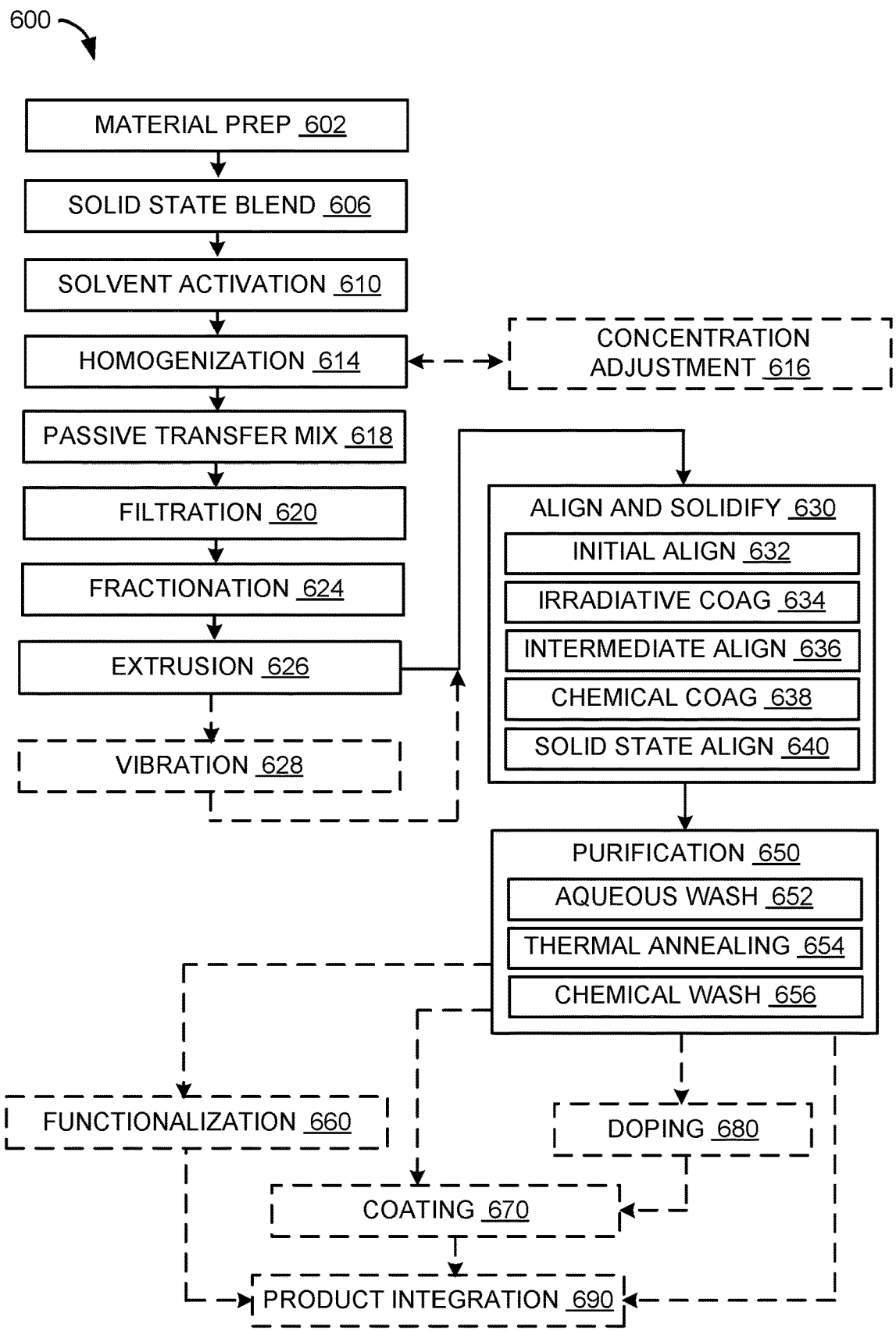
FIG. 6 is a flowchart for a method of manufacture of the aligned carbon nanotube product 102 of FIG. 1 by the carbon nanotube product manufacturing system of FIG. 1.

Referring now to FIG. 6, therein is shown a flowchart for a method 600 of manufacture of the aligned carbon nanotube product 102 of FIG. 1 by the carbon nanotube product manufacturing system 100 of FIG. 1. The method 600 can include a number of steps to manufacture the aligned carbon nanotube product 102. The following manufacturing steps and are arranged below for illustrative purposes, although it is understood that the steps can be arranged in other sequences or arrangements.

In an embodiment of the invention, the method 600 can include a material preparation step 602. The material preparation step 602 is for preparing materials to be processed by the carbon nanotube product manufacturing system 100. For example, in the material preparation step 602, the nanotube solvent 204 can be prepared for solid state blending with the unaligned carbon nanotube material 104.

In some embodiments, the nanotube solvent 204 can be provided in a liquid state to the blending chamber 210 of blending unit 202, both of FIG. 2, and can be cooled to enable solid state blending of the nanotube solvent 204 and the unaligned carbon nanotubes material 104. More specifically, sufficient cooling of the blending chamber 210 can be necessary to convert the nanotube solvent 204 from a liquid state to a solid state and maintain the dry solid state for the duration of the blending process. The forming of the solid solvent particles 206 during blending can ensure that the initiation of reaction between nanotube solvent 204 and the unaligned carbon nanotube material 104 is prevented. For example, prior to introduction of the nanotube solvent 214, the material preparation step 602 can include introducing a chamber coolant in a liquid or gaseous phase into the blending chamber 210 until a solid blending temperature is reached. As a specific example, the solid blending temperature is preferably less than 100° C. It is preferred that chamber coolant is a chemically inert substance, such as nitrogen (N2) or helium (He). The chamber coolant can be introduced into the blending chamber 210 by a pressure differential directed along a contained pathway from a coolant reservoir into the blending chamber 210 to cool and maintain the interior of the blending chamber 210 at the solid blending temperature. Optionally, the unaligned carbon nanotube material 104 can be introduced to the blending unit 202 for cooling to the solid blending temperature prior to introduction of the nanotube solvent 204.

Prior to introducing the nanotube solvent 204 into the blending chamber 210, the nanotube solvent 204 can be stored in a compartment or reservoir of the blending unit 202. Once the blending chamber 210 has been prepared, such as after cooling to the solid blending temperature *, the method 600 can continue to a solid state blending step 606. The solid state blending step 606 is for dry solid state comminuting, classification, blending, or a combination thereof of materials. More specifically, a free-flowing powder blend material that will not spontaneously separate or segregate during transfer can be produced. For example, in the solid state blending step 606, the nanotube solvent 204 in a dry solid state can be blended with the unaligned carbon nanotube material 104 to form the solid state blend 208 of FIG. 1 as a dry mixture. In the solid state blending step 606, the unaligned carbon nanotube material 104 can be introduced to the blending chamber 210 of the blending unit 202. As an example, the unaligned carbon nanotube material 104 can be introduced into the blending chamber 210 at a rate to maintain a state of being "starve-fed".

In one embodiment, the solid state blending step 606 can continue with the introduction of the nanotube solvent 204 or the solvent precursor material 240 of FIG. 2 into the blending chamber 210. In one implementation of the solid state blending step 606, for the nanotube solvent 204 provided in a liquid state, the nanotube solvent 204 can be introduced into the blending chamber 210 in a way as to promote the formation of the solid solvent particles 206, and more specifically, amorphous or crystalline particles. Formation of the solid solvent particles 206 can be achieved through introducing the nanotube solvent 204 at a sufficiently small droplet size to meet a cooling rate to freeze the nanotube solvent 204. In this implementation, the unaligned carbon nanotube material 104 can be cooled to the solid blending temperature prior to blending with the solid solvent particles 206.

The amount of the nanotube solvent 204 or the solvent precursor material 240 introduced into the blending chamber 210 is dependent on a dope concentration of the nanotube dope solution 112 and the amount of unaligned carbon nanotube material 104 fed into the blending chamber 210. The dope concentration is defined as the concentration of the unaligned carbon nanotube material 104 in the nanotube solvent 204 as determined by weight of the unaligned carbon nanotube material 104. For example, the target concentration can be in the range of 2-20% by weight of the unaligned carbon nanotube material 104 while in the mixing module 110 of FIG. 1, however, it is understood that the concentration can change through the manufacturing process. For example, the dope concentration of the nanotube dope solution 112 at this stage of processing can be lower than that of the nanotube dope solution 112 during extrusion.

In another embodiment of the solid state blending step 606, the unaligned carbon nanotube material 104 can be processed in blending chamber 202 without the addition of the solid solvent particles 206 or the solvent precursor material 240. For example, separation elements of the blending elements in the blending chamber 202 can process the unaligned carbon nanotube material 104, such as separating or breaking up the unaligned carbon nanotube material 104 to increase the exposed surface area of the unaligned carbon nanotube material 104, cool the unaligned carbon nanotube material 104, drying or aerating the unaligned carbon nanotube material 104, or other processes to facilitate downstream processing.

The solid state blending step 606 can allow for ingression of the solid solvent particles 206 or the solvent precursor material 240 onto the exposed surfaces of the unaligned carbon nanotube material 104. For example, the separation instruments of the blending elements in the blending chamber 210 can pull apart the unaligned carbon nanotube material 104 to facilitate blending of the solid solvent particles 206 or the solvent precursor material 240 onto the surface of the unaligned carbon nanotube material 104. The solid state blending step 606 can include recirculating the unaligned carbon nanotube material 104 through the blending chamber 210 to constantly re-exposes the surfaces of the unaligned carbon nanotube material 104 to the solid solvent particles 206 until uniform distribution of the solid solvent particles 206 through the unaligned carbon nanotube material 104 is achieved. This distribution of the solid solvent particles 206 is preferably randomized, in proportions as defined by target concentration and consist of highly similar solvent and solute particle shapes and sizes, preferably within 10% standard variation in size along the longest particle dimension, more preferably within 5% standard variation in size along the longest particle dimension, most preferably within 1% standard variation in size along the longest particle dimension.

It has been discovered that the solid state blending step 606 provides controlled introduction of the nanotube solvent 204 to the unaligned carbon nanotube material 104, which is critically important to controlling the protonation reaction that is enthalpically favored and diffusion-limited. The solid state blending step 606 allows for dispersion of the nanotube solvent without initiating the chemical reaction between the nanotube solvent 204 and the unaligned carbon nanotube material 104 until uniform blending of the solid solvent particles 206 has been achieved, which provides uniform and controlled dissolution of the unaligned carbon nanotube material 104 into the nanotube solvent 204. This can maximize the dispersion of the carbon nanotube molecules 106 and optimizes alignment of the carbon nanotube molecules 106 when producing the aligned carbon nanotube product 102.

Once blending between the solid solvent particles 206 or the solvent precursor material 240 and the unaligned carbon nanotube material 104 has been completed in the solid state blending step 606, the method 600 can continue to a solvent activation step 610. The solvent activation step 610 is for activating the solid solvent particles 206, the solvent precursor material 240, or a combination thereof. In the solvent activation step 610, the solid state blend 208 can be transferred to the homogenization unit 220 of FIG. 2.

In one embodiment the nanotube solvent 204 can be activated by liquefying the solid solvent particles 206. For example, the nanotube solvent 204 in the cryogenic solid state can be activated by controlled heating from the solid blending temperature to a solution mixing temperature. In general, the solution mixing temperature is below that which will cause degradation of the nanotube solvent 204. In the specific example of the nanotube solvent 204 as chlorosulfonic acid, the solution mixing temperature can range from 25° C. to 80° C., but not to exceed the boiling temperature of 154° C. to 156° C. at atmospheric pressure, and more preferably under 80° C. In some embodiments, the solution mixing temperature can exceed the boiling temperature of chlorosulfonic acid when controlled under a saturated HCl atmosphere, which can prevent degradation of the chlorosulfonic acid.

Liquefying the solid solvent particles 206 activates a protonation reaction between the nanotube solvent 204 and the unaligned carbon nanotube material 104. The protonation reaction initiates the formation of a true solution as the delocalized 7E electron on the sp2 carbon lattice is protonated and electrostatic repulsion between protons on the molecular backbone of the carbon nanotube molecules 106 overcome the attractive van-der-Waals forces between one another, allowing the carbon nanotube molecules 106 to separate and go into solution.

In another embodiment of the solvent activation step 606, the nanotube solvent 204 can be activated by introduction of the solvent activation agent 242 of FIG. 2 into the solid state blend 208 that includes the solvent precursor material 240. For example, the solvent precursor material 240 of phosphorous pentachloride and the solvent activation agent 242 of sulfuric acid can be reacted in the enclosed mixing chamber 224 at a controlled heating rate to produce the nanotube solvent 204 of chlorosulfonic acid.

Following the solvent activation step 610, the method 600 can proceed to a homogenization step 614. The homogenization step 614 is for producing the nanotube dope solution 112. In the homogenization step 614, the homogenization unit 220 can mix the unaligned carbon nanotube material 104 with the nanotube solvent 204 that is in the liquid state. In one embodiment of the homogenization step 614, the nanotube solvent 204 produced from liquefaction of the solid solvent particles 206 or reaction between the solvent precursor material 240 and the solvent activation agent 242 can be mixed with the unaligned carbon nanotube material 104. In another embodiment of the homogenization step 614, the nanotube solvent 204, such as liquid chlorosulfonic acid or a supercritical fluid, can be introduced into the homogenization unit 220 for shear mixing with the unaligned carbon nanotube material 104 that has not been blended with the solid solvent particles 206 or the solvent precursor material 240. Mixing of the unaligned carbon nanotube material 104 and the nanotube solvent 204 can produce the nanotube dope solution 112 that is in an optically birefringent nematic liquid crystalline phase.

In general, the nanotube dope solution 112 can be produced at a concentration in the range of 2-20% by weight of the unaligned carbon nanotube material 104, however it is understood that the nanotube dope solution 112 can be produced at different concentrations. For example, additional quantities can be introduced into the enclosed mixing chamber to reduce the concentration of the nanotube dope solution 112.

During the homogenization step 614, the nanotube dope solution 112 can be evaluated to determine the degree of protonation between the nanotube solvent 204 and the unaligned carbon nanotube material 104. For example, the measurement devices of the homogenization unit 220, can monitor the properties or characteristics of the nanotube dope solution 112, such as wavelength shifts and viscosity, to determine whether adequate homogenization of the nanotube dope solution 112 has been reached. In one specific example, the wavelength shift associated with the protonation of the sp2 carbon structure can be measured by the measurement devices, such as the inline Raman spectrometer. In another specific example, the viscoelasticity and optical birefringence of the nanotube dope solution 112 can be measured to determine the degree of liquid crystal formation by the measurement devices, such as mechanical, optical, or other non-contact rheometers. The nanotube dope solution 112 can be recirculated through the homogenization unit 220 via the flow recirculation loop 226 of FIG. 2 until satisfactory protonation is achieved.

Both the solvent activation step 610 and the homogenization step 614 can be performed in the homogenization unit 220. The homogenization unit 220 can evacuate by-products produced from the protonation reaction, such as hydrochloric acid gas, during the solvent activation step 610, the homogenization step 614, or a combination thereof.

The method 600 can optionally include a concentration adjustment step 616, as indicated by the dashed arrows and lines. The concentration adjustment step 616 is for adjusting the concentration of the nanotube dope solution 112. In some embodiments, the unaligned carbon nanotube material 104 and the nanotube solvent 204 can be charged into the blending unit 202 in such a proportion as to target a concentration that is lower than that of the target concentration for the nanotube dope solution 112 during formation of the nanotube proto-product 122 of FIG. 1 to reduce strain on the various units and elements in the mixing module 110. The final target concentration for the nanotube dope solution 112 can be achieved by feeding the reduced concentration form of the nanotube dope solution 112 into the concentration adjustment unit 230 of FIG. 2, which can evaporating the nanotube solvent 204 without degradation.

In the concentration adjustment step 616, the concentration adjustment unit 230 can be operated under temperature and atmospheric conditions to prevent degradation of the nanotube solvent 204. For example, the concentration adjustment unit 230 can be operated to provide an HCl gas enriched or saturated atmosphere that can be co-fluxed or co-flowed with nanotube solvent 204 that has evaporated from the nanotube dope solution 112. In general, the concentration adjustment unit 230 can be operated at pressures of 30 to 35 mm Hg or 0.039 to 0.046 atmospheres and temperatures ranging from 85 to 90° C.

Once sufficient mixing and target concentration of the nanotube dope solution 112 has been achieved in the homogenization step 614, the nanotube dope solution 112 can undergo a passive transfer mixing step 618. In the passive transfer mixing step 618, the nanotube dope solution 112 can undergo additional passive mixing through the static mixing elements of FIG. 3 along the fluid path during transfer from the mixing module 110 to the extrusion module 120. The purpose of passive transfer mixing step 618 is to create a sustained turbulent flow regime for the nanotube dope solution 112. Turbulent flow of the nanotube dope solution 112 provides continued mixing while also providing controlled heat transfer within the nanotube dope solution 112, such as through heat exchange fluid recirculation inside and outside the static mixing elements.

The method 600 can include a filtration step 620 to remove the impurities from the nanotube dope solution 112. For example, it is possible that in some cases, despite the use the unaligned carbon nanotube material 104 that has been purified, impurities, such as multiple undispersed, undesired particles, insufficiently pure instances of the unaligned carbon nanotube material 104, residual catalyst particles, and residual amorphous or sp3 carbon, or a combination thereof can be present in the nanotube dope solution 112. The impurities can be removed from the nanotube dope solution 112 in the filtration step 620 by passing the nanotube dope solution 112 through the filtration unit 302 of FIG. 3. As an example, filtration of the impurities can be achieved by flow through the filtration elements 304 of FIG. 3, such as the coarse filtration element 330, the fine filtration element 332, or a combination thereof. The inclusion of the coarse filtration element 330 or the fine filtration element 332 can depend on initial purity of the unaligned carbon nanotube material 104.

Following the filtration step 620, the process flow can continue to a fractionation step 624. The fractionation step 624 is for separation of the carbon nanotube molecules 106 in the nanotube dope solution 112 based on the aspect ratio of the carbon nanotube molecules 106. In general, the nanotube dope solution 112 can include a mixture of the carbon nanotube molecules 106 having a wide range of aspect ratios. In the fractionation step 624, the nanotube dope solution 112 can be subjected to shear flow in the fractionation pathway 306 of the extrusion flow manifold 316, both of FIG. 3. Under sufficiently high shear, it is expected that the nanotube dope solution 112 will phase separate into the highly crystalline phase 340 of FIG. 3, which is comprised primarily of the carbon nanotube molecules 106 having the highest aspect ratio in the nanotube dope solution 112, and the concentrated isotropic phase 342 of FIG. 3, which is comprised primarily of the carbon nanotube molecules 106 having the lowest aspect ratio in the nanotube dope solution 112.

In the fractionation step 624, the extrusion flow manifold 316 can separate and redirect the concentrated isotropic phase 342 from the highly crystalline phase 340 as processing waste or low-grade material. The highly crystalline phase can be allowed to proceed towards the extrusion assembly 310 of FIG. 3. During transfer to the extrusion assembly 310, additional homogenization and temperature control can be imparted on the nanotube dope solution 112 through a static mixer or an assembly of static mixers of the extrusion flow manifold 316.

The process continues from the fractionation step 624 to an extrusion step 626. In the extrusion step 626, the nanotube dope solution 112 is processed to impart the initial form and alignment for the aligned carbon nanotube product 102, which is the carbon nanotube proto-product 122. For example, the nanotube dope solution 112 can flow through the one of the various possible configurations of the extrusion assembly 310 of FIG. 3 to produce the carbon nanotube proto-product 122 of a particular form, shape, or dimension, such as the fiber, filament, or film. In some embodiments, the liquid crystalline domains of the nanotube dope solution 112 can be twisted, rotated, or a combination thereof during the extrusion step 626 to confer extra strength to the carbon nanotube proto-product 122 once the domains are solidified in the twisted configuration, a spiral configuration, a helical configuration, or a combination thereof.

The extrusion step 626 can optionally include a flow vibration step 628, as indicated by the dashed arrows and lines. The flow vibration step 628 is for facilitating the flow of the nanotube dope solution 112 through the extrusion die 314. For example, in the flow vibration step 628, the extrusion die 314 can be vibrated by the vibratory apparatus to aid flow of the nanotube dope solution 112 through the extrusion die 314 by disturbing undesired elastic turbulence immediately prior to the outlet of the extrusion die 314, improving flow stability by reducing undesirable frictional and shearing effects along flow surfaces, or a combination thereof.

Following the extrusion step 626, the carbon nanotube proto-product 122 can continue to an alignment and solidification step 630. At this stage, the carbon nanotube proto-product 112 can be produced having a composition that is primarily of the nanotube solvent 204, as measured by volume or weight fraction. In the alignment and solidification step 630, the carbon nanotube proto-product 122 is processed in a combination of drawing and alignment processes to form the aligned carbon nanotube product 102. As an example, the alignment and solidification step 630 can include an initial alignment step 632, an irradiative coagulation step 634, an intermediate alignment step 636, a chemical coagulation step 638, a solid state alignment step 640, or a combination thereof.

The initial alignment step 632 can follow production of the carbon nanotube proto-product 122 in order to impart an initial alignment to the carbon nanotube proto-product 122. For example, in the initial alignment step 632, the carbon nanotube proto-product 122 can be drawn under tension by the initial alignment unit 402 of FIG. 4 to align of the carbon nanotube molecules 106 in the carbon nanotube proto-product 122 by, for example, operating the initial alignment unit 402 at a draw rate that is a speed faster than the flow speed for the carbon nanotube proto-product 122 as it exits the extrusion die 314 of FIG. 4. As an example, the draw rate during the initial alignment step 632 can be set to produce an alignment corresponding to a Herman orientation factor of preferably at least 0.8, more preferably at least 0.9, and most preferably at least 0.95 as measured by in-line X-ray or neutron scattering techniques.

The irradiative coagulation step 634 can follow the initial alignment step 632. The irradiative coagulation step 634 is for initiating solidification through exposing the carbon nanotube proto-product 122 to radiation from the radiation source 406 of FIG. 4. In the irradiative coagulation step 634, the carbon nanotube proto-product 122 is exposed to radiation, such as infrared radiation, from the radiation source 406 at a wavelength that minimizes absorption by the nanotube solvent 204 and maximizes absorption of the radiation by carbon nanotube molecules 106 of the carbon nanotube proto-product 122. As an example, the irradiative coagulation unit 404 can produce incident irradiation at a wavelength in the range of 1 to 130 µm. The irradiative coagulation step 634 can include pulsing of the radiation source 406 to prevent localized heating effects in and along the carbon nanotube proto-product 122. The irradiative coagulation step 634 can provide convective heat transfer through, for example, evacuation of the nanotube solvent 204 from the irradiative coagulation unit 404 and impose gas flow in the atmosphere surrounding the carbon nanotube proto-product 122, as well as aid in conveying the carbon nanotube proto-product 122.

The intermediate alignment step 636 can follow the irradiative coagulation step 634. The intermediate alignment step 636 is for imparting alignment to the carbon nanotube proto-product 122. In the intermediate alignment step 636, the carbon nanotube proto-product 122 is in a partially solidified state and can be drawn under tension by the intermediate alignment unit 408 of FIG. 4 to align of the carbon nanotube molecules 106 in the carbon nanotube proto-product 122 by, for example, operating the intermediate alignment unit 408 at a speed faster than the flow speed for the carbon nanotube proto-product 122 as it exits the extrusion die 314. The rate and tension under which the carbon nanotube proto-product 122 is drawn by the intermediate alignment unit 408 can be the same as, greater than, or less than that of the initial alignment unit 402 in the initial alignment step 632.

The chemical coagulation step 638 can follow the intermediate alignment step 636. In the chemical coagulation step 638, the carbon nanotube proto-product 122 is solidified through exposure to the chemical coagulant 412. For example, the carbon nanotube proto-product 122 can be exposed to the chemical coagulant 412 in the chemical coagulation unit 410 of FIG. 4. As specific examples, exposing the carbon nanotube proto-product 122 to the chemical coagulant 412 can include spraying, bath immersion, passing through a fluid film that is continuously renewed, or a combination thereof. The chemical coagulation step 638 can provide a homogeneous rate of coagulation along the cross-section of the carbon nanotube proto-product 122. Further, the chemical coagulation step 638 can include atmospheric control of the chemical coagulation unit 410 and convective heat transfer through evacuation of the volatile substances and imposed gas flow on the atmosphere surrounding the carbon nanotube proto-product 122, as well as aid in conveying the carbon nanotube proto-product 122.

The solid state alignment step 640 can follow the irradiative coagulation step 634, the chemical coagulation step 638, or a combination thereof. The solid state alignment step 640 is for solid state alignment of the carbon nanotube proto-product 122. In the solid state alignment step 640, solidification of the carbon nanotube proto-product 122 is nearly complete and can be drawn under tension by the solid state alignment unit 414 of FIG. 4 to impose the final degree of alignment to the carbon nanotube molecules 106 in the carbon nanotube proto-product 122 in order to form the aligned carbon nanotube product 102, set the final dimensions of the aligned carbon nanotube product 102, or a combination thereof. As an example, the solid state alignment unit 414 can be operated at a speed faster than the flow speed for the carbon nanotube proto-product 122 as it exits the extrusion die 314. The rate and tension under which the carbon nanotube proto-product 122 is drawn by the solid state alignment unit 414 can be the same as, greater than, or less than that of the initial alignment unit 402 in the initial alignment step 632, the intermediate alignment unit 408 in the intermediate alignment step 404, or a combination thereof. The aligned carbon nanotube product 102 can be wound on a creel for storage following the solid state alignment step 640.

Following production of the aligned carbon nanotube product 102, the method 600 can continue to a purification step 650. In the purification step 650, the aligned carbon nanotube product 102 can undergo a combination of one or more processes to remove residual amounts of the nanotube solvent 204, residual amounts of the chemical coagulant 412, any other undesired residual particle on the aligned carbon nanotube product 102, or a combination thereof. As an example, the purification step 650 can include an aqueous wash step 652, a thermal annealing step 654, a chemical wash step 656, or a combination thereof. The purification step 650 represents one embodiment for purifying the aligned carbon nanotube product 102, although it is understood that additional steps and other permutation or arrangements can be implemented.

The aqueous wash step 652 is for removing residual traces of the nanotube solvent from the aligned carbon nanotube product 102. In the aqueous wash step 652, the aligned carbon nanotube product 102 can be exposed to an aqueous solution, such as distilled or purified water, in the solvent removal unit 504 of FIG. 5 to remove residual amounts of the nanotube solvent 204. For example, exposing the aligned carbon nanotube product 102 to the aqueous solution can include can include spraying, bath immersion, passing through a fluid film which that is continuously renewed, or a combination thereof. During the aqueous wash step 652, the aqueous solution can be maintained at a temperature in the range of 60° C. to 80° C.

The thermal annealing step 654 is for removing residual traces of the chemical coagulant 412 from the aligned carbon nanotube product 102. The thermal annealing step 654 can be carried out in the thermal annealing unit 506 of FIG. 5 in a heated and controlled environment. For example, in the thermal annealing step 654, the aligned carbon nanotube product 102 can be heated to a volatilization temperature in the thermal annealing unit 506 to remove remaining amounts of the chemical coagulant 412. As a specific example, the volatilization temperature can be in a range of 120° C. to 250° C.

The chemical wash step 656 is for removing by-products from reactions between the nanotube coagulant and the nanotube solvent 204. For example, in the chemical wash step 656, the aligned carbon nanotube product 102 can be exposed to the chemical wash solution of FIG. 5 in the chemical wash unit 508 of FIG. 5. As specific examples, exposing the aligned carbon nanotube product 102 to the chemical wash solution can include spraying, bath immersion, passing through a fluid film that is continuously renewed, or a combination thereof. The chemical wash solution can be a non-carbon nanotube solvent that can remove any undesired by-products of reaction between the nanotube solvent 204 the chemical coagulant 412.

The method 600 can include one or more optional steps to modify the aligned carbon nanotube product 102. For example, the method 600 can optionally include a functionalization step 660, a coating step 670, a doping step 680, a product integration step 690, or a combination thereof.

The functionalization step 660 is for modifying the molecular structure of the aligned carbon nanotube product 102. For example, the functionalization step 660 can include a vulcanization process, which can cross-link the carbon nanotube molecules 106 in the aligned carbon nanotube product 102. As a specific example, in the vulcanization process, sulfur groups can be attached to the molecular backbone of the carbon nanotube molecules 106 by doping the aligned carbon nanotube product 102 with polystyrene sulfonate (PEDOT), which can then annealed at 800° C. in an oxygen-free atmosphere in the oven of the functionalization unit 512 of FIG. 5. Once a set number of the sulfur groups have been attached to the molecular backbones of the carbon nanotube molecules 106, a standard vulcanization reaction to cross-link the sulfur groups can be performed.

The functionalization step 660 that includes vulcanization can increase the mechanical properties of the aligned carbon nanotube product 102, but can reduce electrical conductivity of the aligned carbon nanotube product 102. Similarly, other forms of chemical functionalization are possible, but can also come at the expense of a reduction in electrical conductivity.

The coating step 670 is for coating the surface of the aligned carbon nanotube product 102. In the coating step 670, a layer of coating substance can be applied to the surface of the aligned carbon nanotube product 102. In one example, the coating substance can be applied to the aligned carbon nanotube product 102 through a mechanical process, such as dip-coating, roll-to-roll coating, slide-coating, immersion coating, or other available mechanical coating technologies, as determined by the coating material. In another example, the coating substance can be applied to the aligned carbon nanotube product 102 through an electrolytic process, including immersion of the to the aligned carbon nanotube product 102 in an electrolytic bath containing an ionic compound in an aqueous dispersion at a suitable zeta potential level. In a further example, the coating substance can be applied to the aligned carbon nanotube product 102 through electrostatic coating of charged solid particles or gas-phase deposition.

The doping step 680 is for non-covalent chemical functionalization of the aligned carbon nanotube product 102. For example, in the doping step 680, the aligned carbon nanotube product 102 can undergo p-type doping with p-type donors, such as iodine or sulfuric acid. In one implementation, the doping step 680 can include gas phase doping, such as with iodine doping. In another implementation, the doping step 680 can include liquid phase doping, such as with acid doping. Following the doping step 680, the aligned carbon nanotube product 102 can be coated in the coating step 670 to ensure dopant stability over time.

The product integration step 690 is for integration of the aligned carbon nanotube product 102 into devices, components, or structures. For example, the aligned carbon nanotube product 102 produced following the alignment and solidification step 630, the purification step 650, the functionalization step 660, the coating step 670, the doping step 680, or a combination thereof can be integrated into a variety of structures, devices, or components through inline or semi-inline processes. Examples of structures can include ropes, yarns, woven fabrics, foams, resin pre-impregnated tapes or fabrics, chopped fiber filler material, laminated films made from the aligned carbon nanotube product 102 or in combination with other materials, such as Kevlar, fiberglass, or metals. In the product integration step 690, the aligned carbon nanotube product 102 can be twisted, braided, woven, pressed, rolled, bonded, laminated, coated, cut or a combination thereof to form the various structures.

Examples of integration of the aligned carbon nanotube product 102 in devices or components can include wire antennas, patch antennas, coil transformers, coaxial cables. In the example of producing the wire antennas, coated or uncoated forms of the aligned carbon nanotube product 102 can be woven into single or multi-filament threads, yarns, or rope which can be cut to length as determined by a specified resonant frequency.

In the example of producing the patch antenna, the cutting the coated or uncoated film form of the aligned carbon nanotube product 102 can be cut to specified antenna geometry. The resulting form can be deposited onto a dielectric substrate, which can be co-extruded using melt or solution processing.

In the example of producing the coil transformer, the aligned carbon nanotube product 102 can be woven into a thread, yard, or rope, which can be wound around a ferritic or magnetic core to form a coil. The number of windings can be determined by the inductance that is to be achieved by the coil.

In the example of producing the coaxial cables, the carbon nanotube proto-product 104 can be co-extruded with a dielectric material. Once the carbon nanotube proto-product 104 has been solidified, the dielectric material can be solidified as an encapsulation with the aligned carbon nanotube product 102 as the inner conductor.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of manufacturing a carbon nanotube product, the method comprising:
   blending an unaligned carbon nanotube material comprising carbon nanotube molecules with solid solvent particles;
   activating a nanotube solvent by liquefying the solid solvent particles;
   producing a nanotube dope solution by mixing the nanotube solvent and the unaligned carbon nanotube material;
   forming a carbon nanotube proto-product by extruding the nanotube dope solution, thereby imparting alignment to carbon nanotube molecules of the carbon nanotube proto-product; and
   forming an aligned carbon nanotube product by solidifying the carbon nanotube proto-product by:
      exposing the carbon nanotube proto-product to an infrared radiation source at a wavelength selected in the range of 1 μm to 130 μm to reduce absorption of the radiation by the nanotube solvent relative to absorption of the radiation by carbon nanotubes of the carbon nanotube proto-product, and
      exposing the carbon nanotube proto-product to a chemical coagulant, wherein the chemical coagulant is a solvent for the nanotube solvent and a non-solvent for the carbon nanotube proto-product.

2. The method of claim 1, wherein forming the carbon nanotube proto-product includes extruding the nanotube dope solution as a nanotube filament.

3. The method of claim 1, wherein forming the carbon nanotube proto-product includes extruding the nanotube dope solution as a nanotube film.

4. The method of claim 1, further comprising cryogenically freezing the nanotube solvent to form the solid solvent particles prior to blending with the unaligned carbon nanotube material.

5. The method of claim 1, wherein activating the nanotube solvent includes heating the solid solvent particles.

6. The method of claim 1, wherein the nanotube solvent is chlorosulfonic acid.

7. The method of claim 1, further comprising, prior to extruding the nanotube dope solution, adding an additional amount of the nanotube solvent in a liquid state to the nanotube dope solution.

8. The method of claim 1, further comprising removing an amount of the nanotube solvent from the nanotube dope solution through evaporation under co-flow with gaseous hydrochloric acid to prevent degradation of the nanotube solvent.

9. The method of claim 1, wherein producing the nanotube dope solution includes producing the nanotube dope solution at a concentration between 2% and 20% by weight of the unaligned carbon nanotube material.

10. The method of claim 1, further comprising fractionating the nanotube dope solution to remove carbon nanotube molecules of the lowest aspect ratio from the nanotube dope solution.

11. The method of claim 1, further comprising drawing the carbon nanotube proto-product to impart further alignment of carbon nanotube molecules in the carbon nanotube proto-product.

12. The method of claim 1, further comprising thermally annealing the aligned carbon nanotube product to remove an amount of the chemical coagulant from the aligned carbon nanotube product.

13. The method of claim 1, further comprising doping the aligned carbon nanotube product.

14. The method of claim 1, further comprising coating the surface of the aligned carbon nanotube product.

15. The method of claim 1, further comprising integrating the aligned carbon nanotube product with additional instances of the aligned carbon nanotube product, other materials, or a combination thereof, to produce an integrated structure selected from yarns, threads, woven fabrics, laminated films, tape, foam, composite pre-impregnated materials, and discrete length chopped fiber material.

16. The method of claim 1, further comprising integrating the aligned carbon nanotube product with additional instances of the aligned carbon nanotube product, other materials, or a combination thereof, to produce a component select from wire antennas, patch antennas, coil transformers, and coaxial cables.

17. The method of claim 1, wherein the infrared radiation is pulsed.

18. The method of claim 1, wherein forming the aligned carbon nanotube product includes, prior to exposing the carbon nanotube-proto-product to the infrared radiation source, an initial alignment step imposing further alignment on carbon nanotube molecules of the carbon nanotube-proto-product.

19. The method of claim 18, wherein forming the aligned carbon nanotube product includes, after exposing the carbon nanotube-proto-product to the infrared radiation source, an intermediate alignment step imposing further alignment on carbon nanotube molecules of the carbon nanotube-proto-product in a partially solidified state.

20. The method of claim 1, wherein exposing the carbon nanotube proto-product to a chemical coagulant includes exposing the carbon nanotube proto-product to a continuously renewed fluid film comprising the chemical coagulant.

21. The method of claim 1, wherein forming the aligned carbon nanotube product includes, after exposing the carbon nanotube-proto-product to the infrared radiation source and the chemical coagulant, a solid state alignment step imposing further alignment on carbon nanotube molecules of the carbon nanotube-proto-product.

* * * * *